(12) United States Patent
Liu et al.

(10) Patent No.: US 12,326,830 B2
(45) Date of Patent: Jun. 10, 2025

(54) METHOD AND SYSTEM FOR AUTOMATICALLY SETTING ADDRESSES

(71) Applicant: Nuvoton Technology Corporation, Hsinchu Science Park (TW)

(72) Inventors: Shu-Hui Liu, Taipei (TW); Chia-Yang Liang, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 133 days.

(21) Appl. No.: 18/362,245

(22) Filed: Jul. 31, 2023

(65) Prior Publication Data

US 2024/0111709 A1     Apr. 4, 2024

(30) Foreign Application Priority Data

Oct. 4, 2022   (TW) .................................. 111137616

(51) Int. Cl.
*G06F 13/42*      (2006.01)
*G06F 13/38*      (2006.01)

(52) U.S. Cl.
CPC ........ *G06F 13/4282* (2013.01); *G06F 13/382* (2013.01); *G06F 2213/0002* (2013.01); *G06F 2213/0042* (2013.01)

(58) Field of Classification Search
CPC ............... G06F 13/4282; G06F 13/382; G06F 2213/0002; G06F 2213/0042
See application file for complete search history.

(56) References Cited

FOREIGN PATENT DOCUMENTS

| CN | 108233968 A | * | 6/2018 | ............... H04B 1/38 |
| CN | 115167640 A | * | 10/2022 | |
| JP | 2001337936 A | * | 12/2001 | |
| WO | WO-2023087140 A1 | * | 5/2023 | |

OTHER PUBLICATIONS

English translation of CN-108233968-A (Year: 2018).*
English translation of CN-115167640-A (Year: 2022).*
English translation of JP-2001337936-A (Year: 2001).*
English translation of WO-2023087140-A1 (Year: 2023).*

* cited by examiner

*Primary Examiner* — Henry Tsai
*Assistant Examiner* — John B Roche
(74) *Attorney, Agent, or Firm* — MUNCY, GEISSLER, OLDS & LOWE, P.C.

(57) ABSTRACT

A method for automatically setting addresses suitable for an RS485 system is provided. The RS485 system includes a host device and a plurality of slave devices. The method includes the following stages. The host device confirms that there are no addresses of the slave devices in a database. The slave devices are turned on in sequence. The slave devices calculate their own respective power-on times. The slave device enter an idle state during the period associated with the power-on time. Only one of the slave devices sends the power-on time to the host device when said slave device leaves the idle state. The host device sets the address of said slave device according to the power-on time when said slave device leaves the idle state.

20 Claims, 8 Drawing Sheets

METHOD AND SYSTEM FOR AUTOMATICALLY SETTING ADDRESSES

CROSS REFERENCE TO RELATED APPLICATIONS

This application claims the benefit of Taiwan Application No. 111137616, filed on, Oct. 4, 2022, the entirety of which is incorporated by reference herein.

BACKGROUND OF THE INVENTION

Field of the Invention

The present invention relates to a method for setting addresses, and, in particular, to a method for automatically setting addresses applied to an RS485 system.

Description of the Related Art

The RS485 system is an electrical connection between a host device and a slave device. "Modbus" is an international standard communications protocol. Most RS485 systems follow the "Modbus" protocol for communication between the host device and slave devices. Each slave device has a set of RS485 ports as input and output ports. In one method for setting the addresses of slave devices that has been widely used in recent years, one of the slave devices is turned on first, and the address is set by the host device, and then the slave device stores the address in the memory. After that, another slave device is turned on, and the address of the other slave device is set and stored in the memory. Finally, the steps described above are repeated until the addresses of all the slave devices have been set.

In another method of setting addresses of slave devices, each slave device includes two sets of RS485 ports, so all of the slave devices that are electrically connected to the host device can be turned on at the same time. One of the two sets of RS485 ports in the slave device is used as an input port, and the other is used as an output port. While the address setting is processing, the input port is turned on and the output port is closed, so the address-setting command cannot be sent to the next slave device, the address setting of all slave devices can be completed in sequence.

The first method mentioned above requires a lengthy startup time, and the second increases the cost of hardware for the slave devices. Therefore, in the application of the RS485 system, how to automatically set the address of a slave device has become an important issue.

BRIEF SUMMARY OF THE INVENTION

An embodiment of the present invention provides a method for automatically setting addresses. The method is suitable for an RS485 system. The RS485 system includes a host device and a plurality of slave devices. The method includes the following stages. The host device confirms that there are no addresses of the slave devices in the database. The slave devices are turned on in sequence. The slave devices calculate their own respective power-on times. The slave devices enter an idle state during the period associated with the power-on time. Only one of the slave devices sends the power-on time to the host device when said slave device leaves the idle state. The host device sets the address of said slave device according to the power-on time when said slave device leaves the idle state.

According to the method described above, the step of turning on the slave devices in sequence includes the following stages. The host device sequentially turns on the slave devices at regular intervals using at least one universal serial bus (USB).

According to the method described above, the step in which the slave devices enter the idle state during the period associated with the power-on time includes the following stages. The host device sends a delay command to the slave devices. The delay command includes an amplification parameter. The slave devices calculate the period associated with the power-on time according to the amplification parameter in the delay command and the power-on time. The slave devices enter the idle state.

According to the method described above, the period associated with the power-on time is equal to the product of the power-on time and the amplification parameter.

According to the method described above, the step in which said slave device sends the power-on time to the host device when it leaves the idle state includes the following stages. The host device sends a discovery command to the slave devices. Said slave device sends the power-on time to the host device through an acknowledgement command according to the discovery command.

The method further includes the following stages. The host device sets the check time. The starting time point of the check time is the time point at which the host device sends the discovery command to the slave devices. The host device resends the discovery command to the slave devices when the host device has not received an acknowledgement command from said slave device within the check time.

According to the method described above, the step in which the slave devices enter an idle state during the period associated with the power-on time includes the following stages. The host device sends a delay command to the slave devices. The delay command includes the amplification parameter and the power-on time point of the slave devices selected based on the number of iterations of the delay command.

According to the method described above, the step in which the slave devices calculating their own respective power-on time of the slave devices includes the following stages. The host device sends a reset command to the slave devices. The slave devices sets their addresses to 0 according to the reset command. The slave devices sets the time points when they are turned on to the time points when they receive the reset command as the power-on time.

According to the method described above, the step in which the host device setting an address for said slave device according to the power-on time when said slave device leaves the idle state includes the following stages. The host device sends an address setting command to the slave devices. The address setting command includes the power-on time of said slave device. Said slave device compares the power-on time in the address setting command with its own power-on time. Said slave device sends an acknowledgement command to the host device to inform the host device that its address setting has been completed when the power-on time in the address-setting command is the same as its own power-on time.

The method further includes the following stages. The host device sets check time. The starting time point of the check time is the time point at which the host device sends the address setting command to the slave devices. The host device resends the address setting command to the slave devices when the host device has not received the acknowledgement command from said slave device within the check time.

According to the method described above, the step in which said slave device sending the power-on time to the host device when said slave device leaves the idle state includes the following stages. The host device sends a discovery command to the slave devices. Said slave device sends the power-on time to the host device through an acknowledgement command according to the discovery command.

According to the method described above, the step in which the host device setting the address for said slave device according to the power-on time when said slave device leaves the idle state includes the following stages. The host device sends an address setting command to the slave devices. The address setting command includes the power-on time of said slave device. Said slave device compares the power-on time in the address setting command with its own power-on time. Said slave device sends an acknowledgement command to the host device to inform the host device that its address setting has been completed when the power-on time in the address-setting command is the same as its own power-on time.

The method further includes the following stages. The host device sets check time. The starting time point of the check time is the time point at which the host device sends the address setting command to the slave devices. The duration of the check time is equal to the regular intervals. The host device resends the address setting command to the slave devices when the host device has not received the acknowledgement command from said slave device within the check time.

The method further includes the following stages. The slave devices receive commands from the host device, but do not send any commands to the host device when the slave devices enter the idle state.

An embodiment of the present invention provides an RS485 system. The RS485 system includes a plurality of slave devices and a host device. The slave devices are turned on in sequence. The slave devices calculate their own respective power-on times and enter an idle state during the period associated with the power-on time. The host device confirms that there are no addresses of the slave devices in a database. When only one of the slave devices leaves the idle state, said slave device sends the power-on time to the host device. When said slave device leaves the idle state, the host device sets the address of said slave device according to the power-on time.

According to the RS485 system described above, the process for the slave devices to calculate their respective power-on times includes the following stages. The host device sends a reset command to the slave devices. The slave devices set their addresses to 0 according to the reset command, and they set the time points when they are turned on to the time points when they receive the reset command as the power-on time.

According to the RS485 system described above, the process for the slave devices to enter the idle state during the period associated with the power-on time includes the following stages. The host device sends a delay command to the slave devices. The delay command includes an amplification parameter. The slave devices calculate the period associated with the power-on time according to the amplification parameter in the delay command and the power-on time. The slave devices enter the idle state.

According to the RS485 system described above, the process to turn on the slave devices sequence includes the following stages. The host device controls the sequential turning-on of the slave devices at regular intervals through at least one universal serial bus (USB).

According to the RS485 system described above, the process for the said slave device to send the power-on time to the host device when said slave device leaves the idle state includes the following stages. The host device sends a discovery command to the slave devices. The said slave device sends the power-on time to the host device through an acknowledgement command according to the discovery command.

According to the RS485 system described above, the process for the host device to set the address of said slave device according to the power-on time when said slave device leaves the idle state includes the following stages. The host device sends an address setting command to the slave devices. The address setting command comprises the power-on time of said slave device. Said slave device compares the power-on time in the address setting command with its own power-on time. Said slave device sends an acknowledgement command to the host device to inform the host device that its address setting has been completed when the power-on time in the address-setting command is the same as its own power-on time.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE INVENTION

Figure 1:
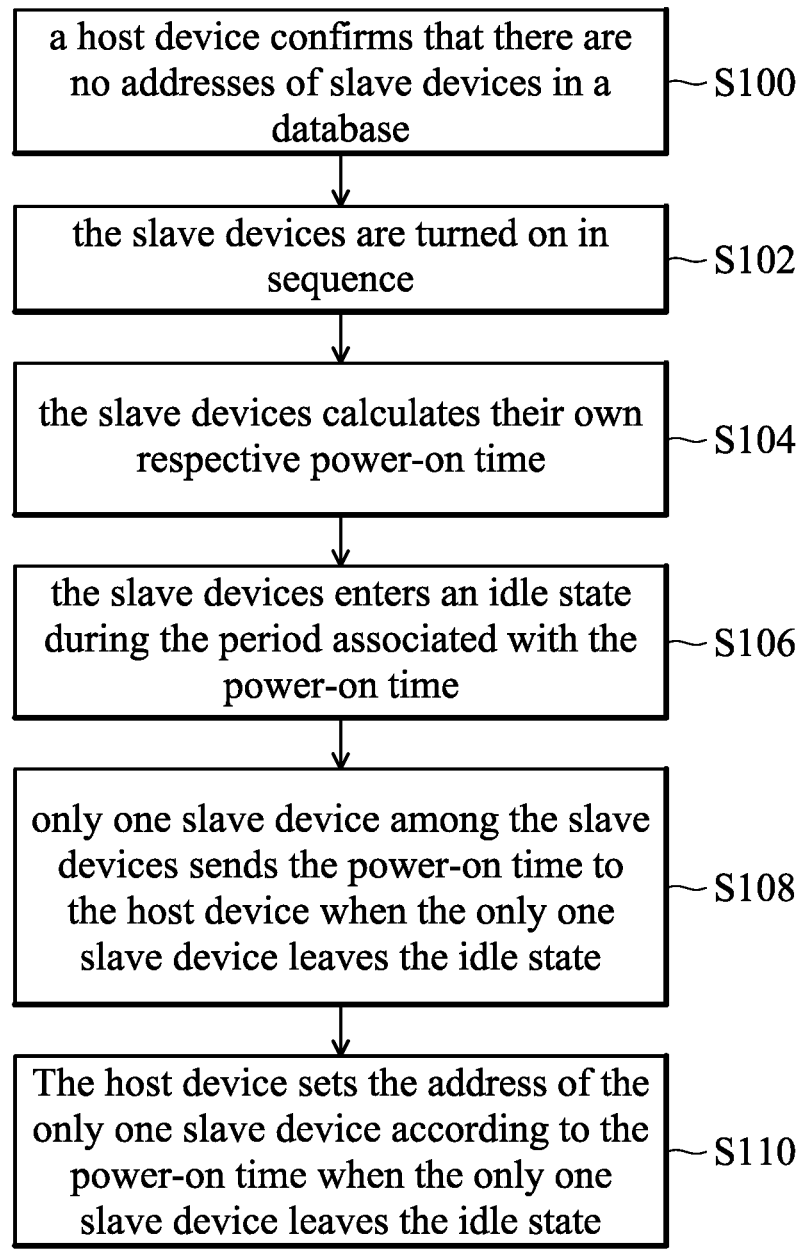
FIG. 1 is a flow chart of a method for automatically setting addresses in accordance with some embodiments of the present invention.

In order to make the above purposes, features, and advantages of some embodiments of the present invention more comprehensible, the following is a detailed description in conjunction with the accompanying drawings.

Certain terms are used throughout the description and following claims to refer to particular components. As one skilled in the art will understand, electronic equipment manufacturers may refer to a component by different names. This document does not intend to distinguish between components that differ in name but not function. It should be understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear," "back", "left", "right", etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

FIG. 1 is a flow chart of a method for automatically setting addresses in accordance with some embodiments of the present invention. As shown in FIG. 1, the method of the present invention for automatically setting addresses includes the following stages. The host device confirms that there are no addresses of the slave devices in a database (step S100). The slave devices are turned on in sequence (step S102). The slave devices calculate their own respective power-on times (Texe) (step S104). The slave devices enter an idle state during the period associated with the power-on time (step S106). Only one of the slave devices sends the power-on time to the host device when said slave device leaves the idle state (step S108). The host device sets the address of said slave device according to the power-on time when said slave device leaves the idle state (step S110).

In step S100, when the host device confirms that the addresses of the slave devices are in the database, the method of the present invention for automatically setting addresses will not perform subsequent steps S102-S110. In other words, the method of the present invention for automatically setting addresses is performed when the address of at least one of the slave devices that are electrically connected to the host device has not been set. In some embodiments, the slave devices are electrically connected in series with each other, and the first slave device is electrically connected to the host, but the present invention is not limited thereto. In step S102, in some embodiments, a power supply supplies power to the slave devices in sequence, so that the slave devices may be turned on in sequence. In some embodiments, the host device may control the output power of the power supply through at least one general-purpose input and output (GPIO) port. For example, the host device may sequentially control the turning-on of the slave devices at regular intervals through the general-purpose input and output port, but the present invention is not limited thereto. In some embodiments, when the slave devices are turned on, the slave devices start recording their own power-on times. In some embodiments, each slave device includes a timer for recording its power-on time, but the present invention is not limited thereto.

Figure 2:
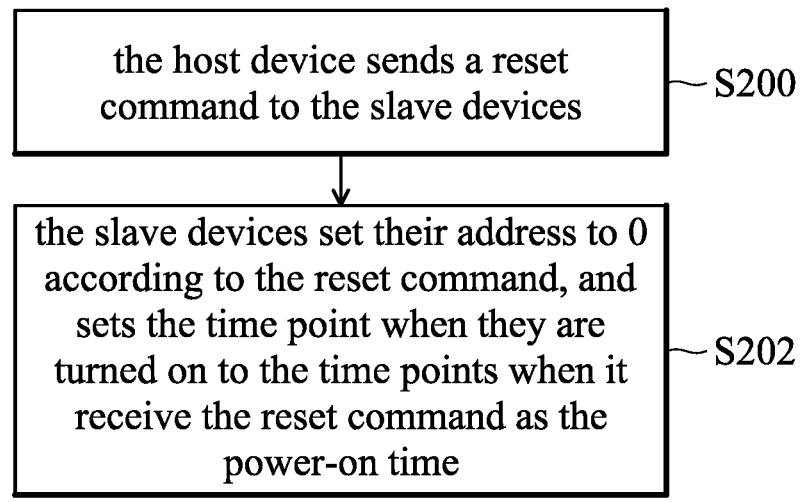
FIG. 2 is a detailed flow chart of step S104 of the method for automatically setting addresses in FIG. 1 in accordance with some embodiments of the present invention.

FIG. 2 is a detailed flow chart of step S104 of the method for automatically setting addresses in FIG. 1, in accordance with some embodiments of the present invention. As shown in FIG. 2, in step S104 of FIG. 1, the method of the present invention for automatically setting addresses includes the following stages. The host device sends a reset command to the slave devices (step S200). The slave devices set their addresses to 0 according to the reset command, and they set the time points when they are turned on to the time points when they receive the reset command as the power-on time (step S202). In other words, when a slave device receives a reset command from the host device, the slave device stops recording its executing time, and stores the calculated power-on time (Texe) in its internal memory. In some embodiments, when a slave device receives a reset command from the host device, the slave device will not send an acknowledgement command (ACK) to the host device, but the present disclosure is not limited thereto. In some embodiments, when a slave device receives a reset command from the host device, the slave device restores its own address to an initial value.

Figure 3A:
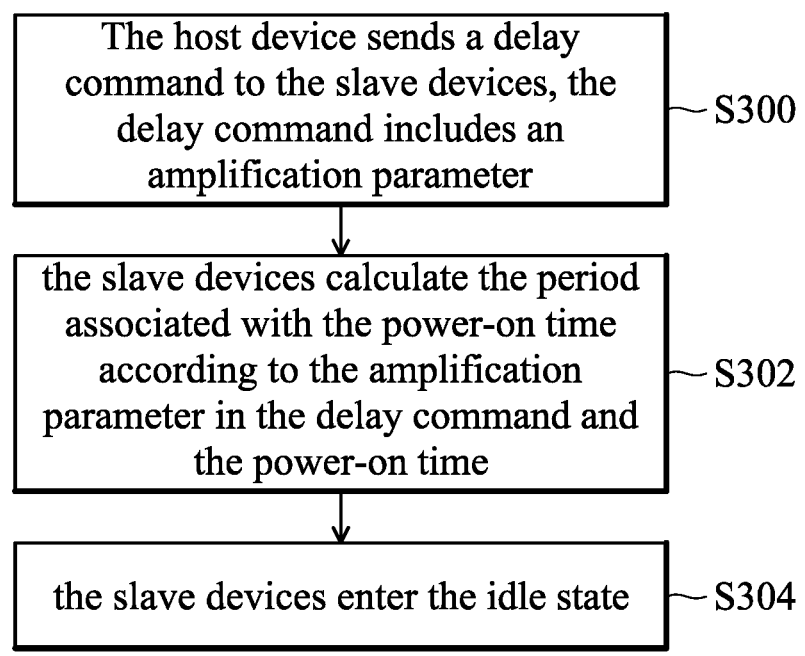
FIG. 3A is a detailed flow chart of step S106 of the method for automatically setting addresses in FIG. 1 in accordance with some embodiments of the present invention.

FIG. 3A is a detailed flow chart of step S106 of the method for automatically setting addresses in FIG. 1 in accordance with some embodiments of the present invention. In some embodiments of FIG. 3, a power supply sequentially supplies power to the slave devices, so that the slave devices are turned on in sequence. The host device does not control the power output from the power supply. As shown in FIG. 3A, in step S106 of FIG. 1, the method of the present invention for automatically setting addresses includes the following stages. The host device sends a delay command to the slave devices. The delay command includes an amplification parameter (Amp) (step S300). The slave devices calculate the period (idle_time) associated with the power-on time according to the amplification parameter (Amp) in the delay command and the power-on time (Texe) (step S302). The slave devices enter the idle state (step S304). In some embodiments, the duration that the slave devices enter the idle state in step S304 is equal to the period associated with the power-on time calculated in step S302. In some embodiments, the period (idle_time) associated with the power-on time in step S302 is equal to the product of the power-on time (Texe) and the amplification parameter (Amp); That is, (idle_time)=(Texe)×(Amp).

In short, when a slave device receives a delay command from the host device, the slave device enters an idle state whose duration is equal to the period (idle_time) associated with the power-on time. In some embodiments, when a slave device enters the idle state, the slave device can only receive commands from the host device, but it cannot send any commands (such as an acknowledgement command) to the host device.

Figure 3B:
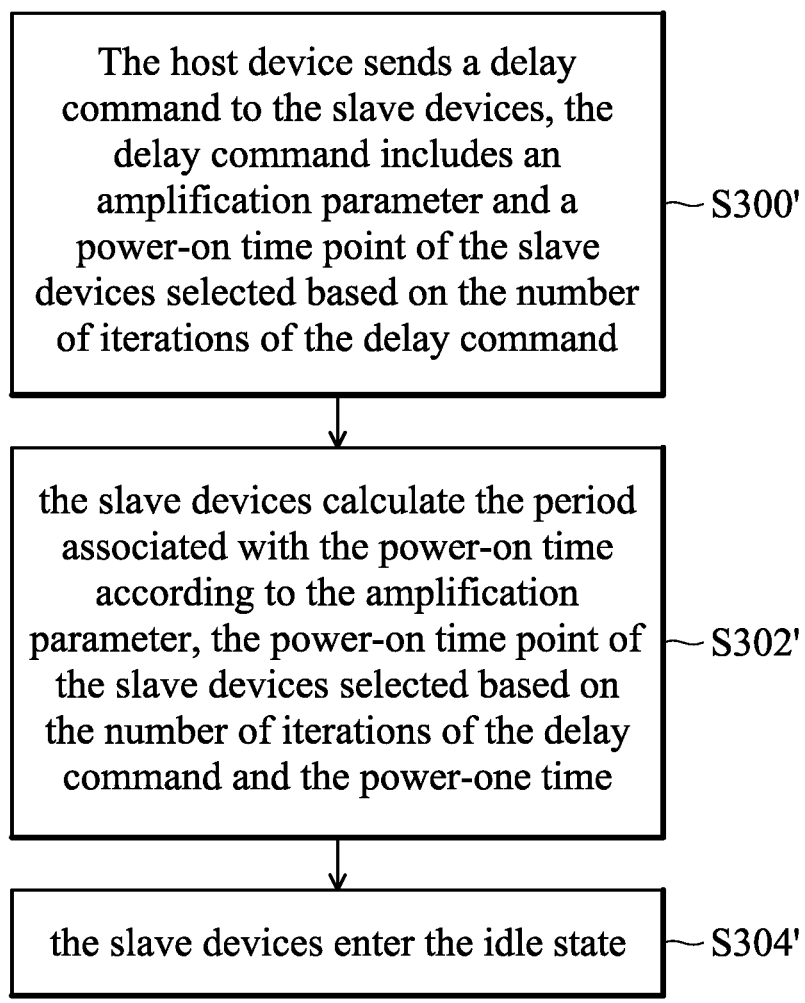
FIG. 3B is a detailed flow chart of step S106 of the method for automatically setting addresses in FIG. 1 in accordance with some embodiments of the present invention.

FIG. 3B is a detailed flow chart of step S106 of the method for automatically setting addresses in FIG. 1 in accordance with some embodiments of the present invention. In some embodiments of FIG. 3B, the host device controls the output power of the power supply through at least one general-purpose input and output port (GPIO). In detail, the host device can sequentially control the turning-on of slave devices at regular intervals through at least one general-purpose input and output port. As shown in FIG. 3B, in step S106 of FIG. 1, the method of the present invention for automatically setting addresses includes the following stages. The host device sends a delay command to the slave devices, wherein the delay command includes the amplification parameter (Amp) and the power-on time point (ref(n)) of the slave devices selected based on the number of iterations of the delay command (step S300'). The slave devices calculate the period associated with the power-on time according to the amplification parameter (Amp), the power-on time point (ref(n)) of the slave devices selected based on the number of iterations of the delay command, and the power-on time (Texe). The slave devices enter the idle state (step S304').

Since the host device can sequentially control the turning-on of the slave devices at regular intervals using at least one general-purpose input and output port, the host device knows the power-on time (boot time point) of each slave device, and therefore the delay command sent to the slave devices may include the power-on time point (ref(n)) of the slave devices selected based on the number of iterations of the delay command. In some embodiments, the duration for which the slave device is in the idle state in step S304' is equal to the period associated with the power-on time calculated in step S302'. In some embodiments, the period (idle_time) associated with the power-on time calculated in step S302' is equal to the product of the time difference between the power-on time (Texe) and the power-on time point (ref(n)) of the slave device, selected based on the number of iterations of the delay command, and the amplification parameter (Amp); That is, (idle_time)=(Texe−ref(n))*(Amp).

It should be noted that the power-on time point (ref(n)) of the slave device that was selected based on the number of iterations of the delay command varies in the address setting of the slave device for each round. For example, in the first iteration of the address setting, the selected power-on time point (ref(1)) of the slave device is the power-on time point of the slave device that is powered on first. In the second iteration of the address setting, the selected power-on time point (ref(2)) of the slave device is the power-on time point of the slave device that is powered on second.

Figure 4:
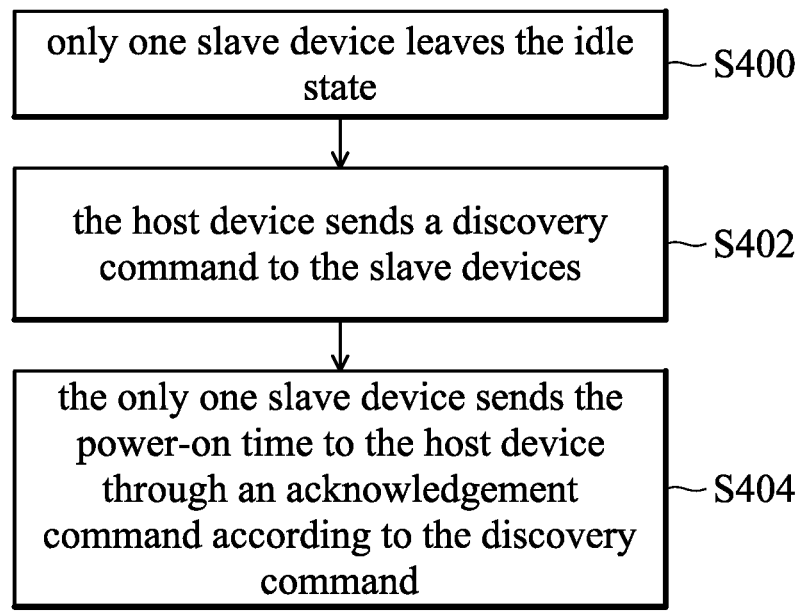
FIG. 4 is a detailed flow chart of step S108 of the method for automatically setting addresses in FIG. 1 in accordance with some embodiments of the present invention.

FIG. 4 is a detailed flow chart of step S108 of the method for automatically setting addresses in FIG. 1 in accordance with some embodiments of the present invention. As shown in FIG. 4, in step S108 of FIG. 1, the method of the present invention for automatically setting addresses includes the following stages. When only one of the slave devices leaves the idle state (step S400), the host device sends a discovery command to the slave devices (step S402). Said slave device sends the power-on time to the host device through an acknowledgement command according to the discovery command (step S404). In contrast, when the slave device is still in the idle state, the slave device will not respond to the discovery command received from the host device. In some embodiments, the starting time point of the check time that has been set by the host device is the time point at which the host device sends a discovery command to the slave device. When the host device has not received an acknowledgement command from the slave device within the check time, the host device will resend the discovery command to the slave device.

Figure 5:
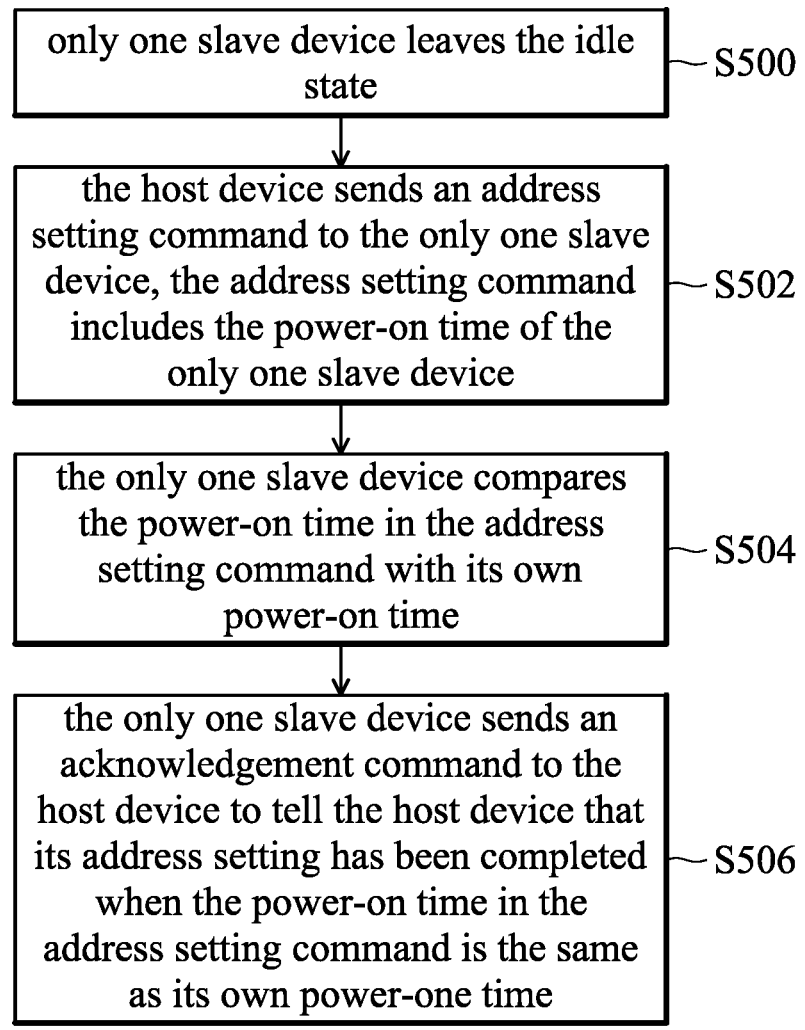
FIG. 5 is a detailed flow chart of step S110 of the method for automatically setting addresses in FIG. 1 in accordance with some embodiments of the present invention.

FIG. 5 is a detailed flow chart of step S110 of the method for automatically setting addresses in FIG. 1 in accordance with some embodiments of the present invention. As shown in FIG. 5, in step S110 of FIG. 1, the method of the present invention for automatically setting addresses includes the following stages. When only one of the slave devices leaves the idle state (step S500), the host device sends an address-setting command to said slave device, wherein the address-setting command includes the power-on time of said slave device (step S502). Said slave device compares the power-on time in the address-setting command with its own power-on time (step S504). Said slave device sends an acknowledgement command (ACK) to the host device to inform the host device that its address setting has been completed when the power-on time in the address-setting command is the same as its own power-on time (step S506). In contrast, when the slave device is still in the idle mode, the slave device will not respond even if it receives the address-setting command from the host device. In some embodiments, the starting time point of the check time set by the host device is the time point at which the host device sends an address-setting command to the slave device. When the host device has not received an acknowledgement command from the slave device within the check time, the host device resends the address-setting command to the slave device.

Figure 6:
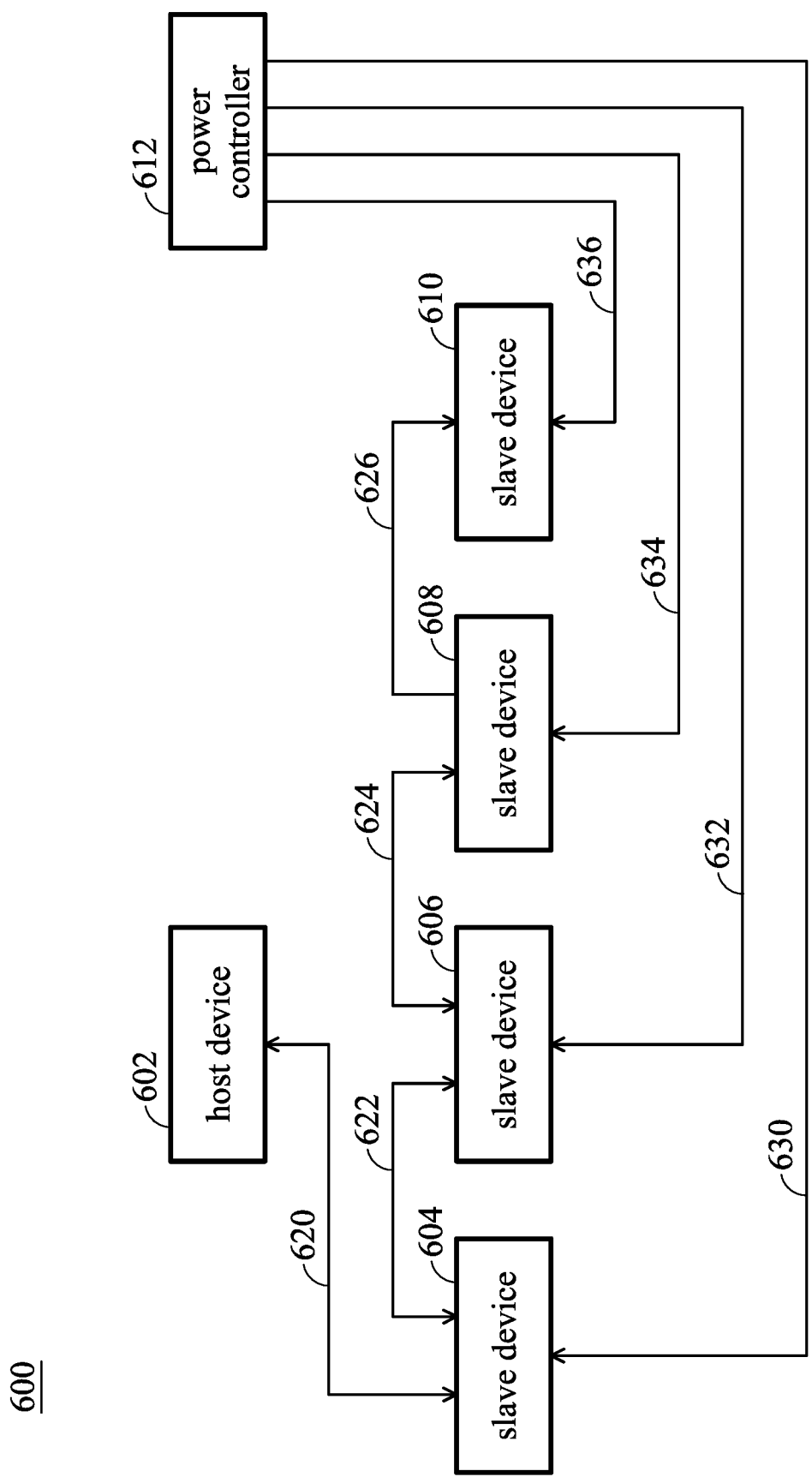
FIG. 6 is a schematic diagram of an RS485 system 600 in accordance with some embodiments of the present invention.

FIG. 6 is a schematic diagram of an RS485 system 600 in accordance with some embodiments of the present invention. As shown in FIG. 6, the RS485 system 600 includes a host device 602, a slave device 604, a slave device 606, a slave device 608, a slave device 610, and a power controller 612. The host device 602 is electrically connected to slave device 604 through a communication line 620. Slave device 604 is electrically connected to slave device 606 through a communication line 622. Slave device 606 is electrically connected to slave device 608 through a communication line 624. Slave device 608 is electrically connected to slave device 610 through a communication line 626. Although the host device 602 is indirectly electrically connected to slave devices 606, 608 and 610, according to the RS485 specification, when the host device 602 sends commands to slave devices 604, 606, 608, and 610, slave devices 604, 606, 608, and 610 can all receive the commands from the host device 602 at the same time.

The power controller 612 supplies power to slave device 604 through power line 630; to slave device 606 through power line 632; to slave device 608 through power line 634; and to slave device 610 through power line 636. It should be noted that although there are four slave devices in FIG. 6, the present invention does not limit the number of slave devices. In other words, the host device 602 may be electrically connected or electrically coupled to a different number of slave devices.

First, the host device 602 confirms that there are no addresses for the slave devices in the database (not shown). The power supply 612 provides power through power lines 630, 632, 634, and 636, so that slave devices 604, 606, 608, and 610 are turned on in sequence. After booting up, slave devices 604, 606, 608, and 610 start recording their respective execution times. For example, slave device 604 boots up at time point 0 ms, and slave device 604 starts recording its execution time at time point 0 ms. Slave device 606 boots up at time point 100 ms, and slave device 606 starts recording its execution time at time point 100 ms. Slave device 608 boots up at time point 300 ms, and slave device 608 starts recording its execution time at time point 300 ms. Slave device 610 boots up at time point 600 ms, and slave device 610 starts recording its execution time at time point 600 ms.

Next, the host device 602 sends a reset command to slave devices 604, 606, 608, and 610. After receiving the reset command from the host device 602, slave devices 604, 606, 608, and 610 stop recording their respective execution times, and store the calculated power-on time (Texe) in their internal memories. For example, slave devices 604, 606, 608, and 610 receive the reset command from the host device 602 at time point 800 ms, then slave device 604 calculates that its power-on time (Texe) is 800 ms (800 ms−0 ms), slave device 606 calculates that its power-on time (Texe) is 700 ms (800 ms−100 ms), slave device 608 calculates that its power-on time (Texe) is 500 ms (800 ms−300 ms), and slave device 610 calculates that its power-on time (Texe) is 200 ms (800 ms−600 ms). Slave devices 604, 606, 608, and 610 also set their own addresses to 0 according to the reset command from the host device 602.

After that, the host device 602 sends a delay command to slave devices 604, 606, 608, and 610. The delay command includes an amplification parameter (Amp). After receiving the delay command from the host device 602, slave devices 604, 606, 608, and 610 each calculate their own period (idle_time) associated with the power-on time according to the amplification parameter (Amp) in the delay command and their own power-on time. For example, it is assumed that the amplification parameter (Amp) is 10. Slave device 604 multiples its own power-on time (for example, 800 ms) by the amplification parameter (for example, 10), and thus the period (idle_time) associated with the power-on time is 8 s. That is, after receiving the delay command from the host device 602, slave device 604 enters an idle state for a duration of 8 s.

Similarly, slave device 606 multiples its own power-on time (for example, 700 ms) by the amplification parameter (for example, 10), and thus the period (idle_time) associated with the power-on time is 7 s. That is, after receiving the delay command from the host device 602, slave device 606 enters the idle state for a duration of 7 s. Slave device 608 multiples its own power-on time (for example, 500 ms) by the amplification parameter (for example, 10), and thus the period (idle_time) associated with the power-on time is 5 s. That is, after receiving the delay command from the host device 602, slave device 608 enters the idle state for a duration of 7 s. Slave device 610 multiples its own power-on time (for example, 200 ms) by the amplification parameter (for example, 10), and thus the period (idle_time) associated with the power-on time is 2 s. That is, after receiving the delay command from the host device 602, slave device 610 enters the idle state for a duration of 2 s.

In some embodiments, 4 seconds after the host device 602 sends the delay command to slave devices 604, 606, 608, and 610, the host device 602 sends a discovery command to slave devices 604, 606, 608, and 610. Since slave device 610 has left the idle state by the time it receives the discovery command from the host device 602, and slave devices 604, 606, and 608 are still in the idle state, only slave device 610 sends its own power-on time (Texe) to the host device 602 through an acknowledgment command (ACK). Even if slave devices 604, 606, and 608 receive the discovery command from the host device 602, they will not respond. Next, the host device 602 receives the acknowledgment command from slave device 610, and obtains the power-on time (Texe) of slave device 610, which is, in this example, 200 ms.

In some embodiments, the host device 602 sets the check time. The starting time point of the check time is the time point at which the host device 602 sends the discovery command to slave devices 604, 606, 608, and 610. When the host device 602 has not received an acknowledgement command from slave devices 604, 606, 608, and 610 within the check time, the host device 602 resends the discovery command to slave devices 604, 606, 608, and 610.

In some embodiments, 4 seconds after the host device 602 sends the delay command to slave devices 604, 606, 608, and 610, the host device 602 sends an address-setting command to slave devices 604, 606, 608, and 610. The address-setting command includes the power-on time (Texe) of slave device 610. For example, it is assumed that the address-setting command includes the power-on time of slave device 610, such as 200 ms. By the time it receives the address-setting command from the host device 602, slave device 610 has left the idle state, but slave devices 604, 606, and 608 are still in the idle state. Therefore, slave device 610 compares the power-on time (Texe) in the address-setting command with its own power-on time. After this comparison is made, the power-on time (Texe) of slave device 610 is the same as the power-on time (Texe) in the address-setting command, so slave device 610 sends an acknowledgement command (ACK) to the host device 602 to inform the host device 602 that its address setting has been completed.

In some embodiments, the host device 602 sets the check time. The starting time point of the check time is the time point at which the host device 602 sends the address-setting command to slave devices 604, 606, 608, and 610. When the host device 602 has not received an acknowledgement command from slave devices 604, 606, 608, and 610 within the check time, the host device 602 resends the address-setting command to slave devices 604, 606, 608, and 610.

After the host device 602 knows that the address of slave device 608 has been set through the acknowledgement command from slave device 608, the host device 602 sends the discovery command to slave devices 604 and 606 again.

It is assumed that slave device 606 has left the idle state when it receives the discovery command again, and slave device 606 sends the power-on time (Texe) to the host device 602 through an acknowledgment command. The host device 602 then sends an address-setting command including the power-on time (Texe) to slave device 606 to allow slave device 606 to perform the comparison. In short, the host device 602 repeatedly sends the discovery command and the address-setting command to the slave devices until all the slave devices have completed the address setting.

Figure 7:
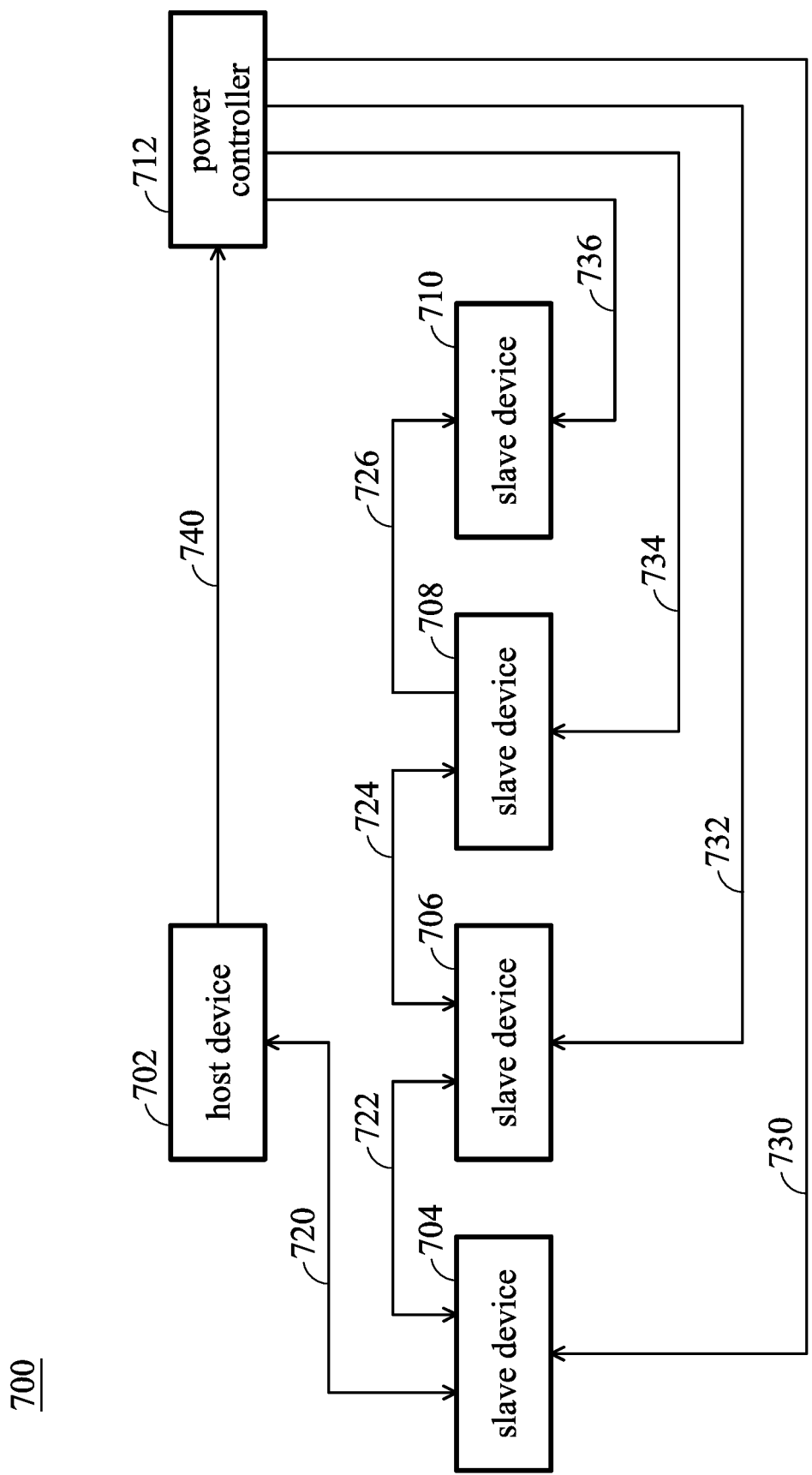
FIG. 7 is a schematic diagram of an RS485 system 700 in accordance with some embodiments of the present invention.

FIG. 7 is a schematic diagram of an RS485 system 700 in accordance with some embodiments of the present invention. As shown in FIG. 7, the RS485 system 700 includes a host device 702, a slave device 704, a slave device 706, a slave device 708, a slave device 710, and a power controller 712. The host device 702 is electrically connected to slave device 704 through a communication line 720. Slave device 704 is electrically connected to slave device 706 through a communication line 722. Slave device 706 is electrically connected to slave device 708 through a communication line 724. Slave device 708 is electrically connected to slave device 710 through a communication line 726. Although the host device 702 is indirectly electrically connected to slave devices 706, 708 and 710, according to the RS485 specification, when the host device 702 sends commands to slave devices 704, 706, 708, and 710, slave devices 704, 706, 708, and 710 can all receive the commands from the host device 702 at the same time.

The power controller 712 supplies power to slave device 704 through power line 730; to slave device 706 through power line 732; to slave device 708 through power line 734; and to slave device 710 through power line 736. It should be noted that although there are four slave devices in FIG. 7, the present invention does not limit the number of slave devices. In other words, the host device 702 may be electrically connected or electrically coupled to a different number of slave devices. The main difference between FIG. 7 and FIG. 6 is that the host device 702 can sequentially control slave devices 704, 706, 708 and 710 to turn on at regular intervals through the general-purpose input and output port 740.

First, the host device 702 confirms that there are no addresses for the slave devices in the database (not shown). The host device 702 controls the power controller 712 through the general-purpose input and output port 740, so that the power controller 712 provides power through power lines 730, 732, 734, and 736, and slave devices 704, 706, 708 and 710 are turned on in sequence at regular intervals. For example, slave device 704 boots up at time point 0 ms, and slave device 704 starts recording its execution time at time point 0 ms. Slave device 706 boots up at time point 300 ms, and slave device 706 starts recording its execution time at time point 300 ms. Slave device 708 boots up at time point 600 ms, and slave device 708 starts recording its execution time at time point 600 ms. Slave device 710 boots up at time point 900 ms, and slave device 710 starts recording its execution time at time point 900 ms. In other words, slave devices 704, 706, 708 and 710 are turned on in sequence at regular intervals of 300 ms.

Next, the host device 702 sends a reset command to slave devices 704, 706, 708, and 710. After receiving the reset command from the host device 702, slave devices 704, 706, 708, and 710 stop recording their respective execution times, and store the calculated power-on time (Texe) in their internal memories, and set their own addresses to 0. For example, slave devices 704, 706, 708, and 710 receive the reset command from the host device 702 at time point 1s, then slave device 704 calculates that its power-on time (Texe) is 1000 ms (1000 ms−0 ms), slave device 706 calculates that its power-on time (Texe) is 700 ms (1000 ms−300 ms), slave device 708 calculates that its power-on time (Texe) is 400 ms (1000 ms−600 ms), and slave device 710 calculates that its power-on time (Texe) is 100 ms (1000 ms−900 ms).

After that, the host device 702 sends a delay command to slave devices 704, 706, 708, and 710. The delay command includes the amplification parameter (Amp) and the power-on time point (ref(n)) of slave device 704, 706, 708, or 710 selected based on the number of iterations of the delay command. For example, of slave devices 704, 706, 708, and 710, slave device 704 is the first to power on, so in the first iteration of the delay command, the power-on time point (ref(1)) of slave device 704 is selected. Of slave devices 704, 706, 708, and 710, slave device 706 is the second one to power on, so in the second iteration of the delay command, the power-on time point (ref(2)) of slave device 706 is selected. After receiving the delay command from the host device 702, slave devices 704, 706, 708, and 710 calculate the periods (idle_time) associated with their respective power-on times according to the amplification parameter (Amp), the power-on time point (ref(1)) of slave device 704 selected based on the number of iterations of the delay command, and their own power-on times (Texe). For example, it is assumed that the amplification parameter (Amp) is 10. Slave device 704 multiples the time difference between the power-on time (for example, 1000 ms) and the power-on time point (for example, 0 ms) of slave device 704, selected based on the number of iterations of the delay command, by the amplification parameter (Amp) (for example, 10), and a period (idle_time) associated with a power-on time of 10 s is obtained. That is, after slave device 704 receives the delay command from the host device 702, slave device 704 will enter the idle state for a duration of 10 s.

Similarly, slave device 706 multiples the time difference between the power-on time (for example, 700 ms) and the power-on time point (for example, 0 ms) of slave device 704, selected based on the number of iterations of the delay command, by the amplification parameter (Amp) (for example, 10), and a period (idle_time) associated with a power-on time of 7 s is obtained. That is, after slave device 706 receives the delay command from the host device 702, slave device 706 will enter the idle state for a duration of 7 s. Slave device 708 multiples the time difference between the power-on time (for example, 400 ms) and the power-on time point (for example, 0 ms) of slave device 704, selected based on the number of iterations of the delay command, by the amplification parameter (Amp) (for example, 10), and a period (idle_time) associated with a power-on time of 4 s is obtained. That is, after slave device 708 receives the delay command from the host device 702, slave device 708 will enter the idle state for a duration of 4 s. Slave device 710 multiples the time difference between the power-on time (for example, 100 ms) and the power-on time point (for example, 0 ms) of slave device 704, selected based on the number of iterations of the delay command, by the amplification parameter (Amp) (for example, 10), and a period (idle_time) associated with a power-on time of 1 s is obtained. That is, after slave device 710 receives the delay command from the host device 702, slave device 710 will enter the idle state for a duration of 1 s.

In some embodiments, when the host device 702 sends the delay command to slave devices 704, 706, 708, and 710, the host device 702 also sets the check time. The check time establishes how long the host device 702 will wait for a response from slave device 704, 706, 708, or 710 when the host device 702 sends the next command to slave devices 704, 706, 708, and 710. When the host device 702 has not received an acknowledgement command from slave devices 704, 706, 708, and 710 within the check time, the host device 702 resends the same command to slave devices 704, 706, 708, and 710. In some embodiments of FIG. 7, the duration of the check time is equal to the regular intervals for sequentially turning on slave devices 704, 706, 708, and 710.

In some embodiments, two seconds after the host device 702 sends the delay command to slave devices 704, 706, 708, and 710, the host device 702 sends a discovery command to slave devices 704, 706, 708, and 710. Since slave device 710 has left the idle state by the time it receives the discovery command from the host device 702, and slave devices 704, 706 and 708 are still in the idle state, only slave device 710 sends its own power-on time (Texe) to the host device 702 through an acknowledgement command (ACK). Even if slave devices 704, 706, and 708 receive a discovery command from the host device 702, they will not respond. Next, the host device 702 receives the acknowledgement command from slave device 710, and obtains the power-on time (Texe) of slave device 710, which is, in this example, 100 ms.

In some embodiments, the host device 702 sets the check time. The starting time point of the check time is the time point at which the host device 702 sends the discovery command to slave devices 704, 706, 708, and 710. When the host device 702 has not received an acknowledgement command from slave device 704, 706, 708, or 710 within the check time, the host device 702 resends the discovery command to slave devices 704, 706, 708, and 710. In some embodiments of FIG. 7, the duration of the check time can be, for example, 300 ms.

In some embodiments, three seconds after the host device 702 sends the delay command to slave devices 704, 706, 708, and 710, the host device 702 sends an address-setting command to slave devices 704, 706, 708, and 710. The address-setting command includes the power-on time (Texe) of slave device 710, for example, 100 ms. By the time it receives the address-setting command from the host device 702, slave device 710 has left the idle state, and slave devices 704, 706, and 708 are still in the idle state. Therefore, slave device 710 compares the power-on time (Texe) in the address-setting command with its own power-on time. After this comparison in made, the power-on time (Texe) of slave device 710 is the same as the power-on time (Texe) in the address-setting command. Therefore, slave device 710 sends an acknowledgement command (ACK) to the host device 702 to inform the host device 702 that the address setting of slave device 710 has been completed.

In some embodiments, the host device 702 sets the check time. The starting time point of the check time is the time point at which the host device 702 sends the address-setting command to slave devices 704, 706, 708, and 710. When the host device 702 has not received an acknowledgement command from slave device 704, 706, 708, or 710 within the check time, the host device 702 resends the address-setting command to slave devices 704, 706, 708, and 710.

After the host device 702 knows that the address of slave device 710 has been set through the acknowledgement command from slave device 710, the host device 702 sends the delay command to slave devices 704, 706, and 708. In the second iteration, since slave device 706 is the second of slave devices 704, 706, 708, and 710 to power on, the power-on time point is 300 ms; That is, ref(2)=300 ms. After receiving the delay command from the host device 702, slave devices 704, 706, and 708 calculate the periods (idle_time) associated with their own power-on times according to the amplification parameter (Amp), the power-on time point ref(2) of slave device 706, selected based on the number of iterations of the delay command, and their own power-on times (Texe). For example, it is assumed that the amplification parameter (Amp) is 10. Slave device 704 multiples the time difference between the power-on time (for example, 1000 ms) and the power-on time point (ref(2)=300 ms) of slave device 706, selected based on the number of iterations of the delay command, by the amplification parameter, (Amp) (for example, 10), and a period (idle_time) associated with a power-on time of 7 s is obtained. That is, after slave device 704 receives the second-round delay command from the host device 702, slave device 704 will enter the idle state for a duration of 7 s.

Similarly, slave device 706 multiples the time difference between the power-on time (for example, 700 ms) and the power-on time point (ref(2)=300 ms) of slave device 706, selected based on the number of iterations of the delay command, by the amplification parameter (Amp) (for example, 10), and a period (idle_time) associated with a power-on time of 4 s is obtained. That is, after slave device 706 receives the second-round delay command from the host device 702, slave device 706 will enter the idle state for a duration of 4 s. Slave device 708 multiples the time difference between the power-on time (for example, 400 ms) and the power-on time point (ref(2)=300 ms) of slave device 706, selected based on the number of iterations of the delay command, by the amplification parameter (Amp) (for example, 10), and a period (idle_time) associated with a power-on time of 1 s is obtained. That is, after slave device 708 receives the second-round delay command from the host device 702, slave device 708 will enter the idle state for a duration of Is.

Assuming that slave device 708 leaves the idle state when it receives the second-round discovery command, slave device 708 sends its power-on time (Texe) to the host device 702 through an acknowledgment command. The host device 702 then sends an address-setting command including the power-on time (Texe) to slave devices 704, 706, and 708, and thus slave devices 704, 706, and 708 are comparable. In short, the host device 702 repeatedly sends the delay command, the discovery command, and the address-setting command to the slave devices until all of the slave devices have completed the address setting.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for automatically setting addresses, suitable for an RS485 system, wherein the RS485 system comprises a host device and a plurality of slave devices, comprising:
confirming that there are no addresses of the slave devices in a database by the host device;
turning on the slave devices in sequence;
calculating their own respective power-on time of the slave devices by the slave devices;
entering an idle state during a period associated with the power-on time by the slave devices;

sending the power-on time to the host device by only one of the slave devices when said slave device leaves the idle state; and setting an address for said slave device according to the power-on time by the host device when said slave device leaves the idle state.

2. The method as claimed in claim 1, wherein the step of turning on the slave devices in sequence comprises:

controlling the sequential turning-on of the slave devices at regular intervals through at least one universal serial bus (USB) by the host device.

3. The method as claimed in claim 2, wherein the step in which the slave devices entering an idle state during the period associated with the power-on time comprises:

sending a delay command to the slave devices by the host device; wherein the delay command comprises an amplification parameter and power-on time points of the slave devices selected based on the number of iterations of the delay command;

calculating the period associated with the power-on time according to the amplification parameter, the power-on time point of the slave devices selected based on the number of iterations of the delay command and the power-on time by the at least one slave device; and entering the idle state for the slave devices.

4. The method as claimed in claim 2, wherein the step in which said slave device sending the power-on time to the host device when said slave device leaves the idle state comprises:

sending a discovery command to the slave devices by the host device; and sending the power-on time to the host device through an acknowledgement command according to the discovery command by said slave device.

5. The method as claimed in claim 2, wherein the step in which the host device setting the address for said slave device according to the power-on time when said slave device leaves the idle state comprises:

sending an address setting command to the slave devices by the host device; wherein the address setting command comprises the power-on time of said slave device;

comparing the power-on time in the address setting command with its own power-on time by said slave device; and sending an acknowledgement command to the host device to inform the host device that its address setting has been completed by said slave device when the power-on time in the address-setting command is the same as its own power-on time.

6. The method as claimed in claim 5, further comprising:

setting check time by the host device; wherein the starting time point of the check time is the time point at which the host device sends the address setting command to the slave devices, and the duration of the check time is equal to the regular intervals; and resending the address setting command to the slave devices by the host device when the host device has not received the acknowledgement command from said slave device within the check time.

7. The method as claimed in claim 1, wherein the step in which the slave devices entering the idle state during the period associated with the power-on time comprises:

sending a delay command to the slave devices by the host device; wherein the delay command comprises an amplification parameter;

calculating the period associated with the power-on time according to the amplification parameter in the delay command and the power-on time by the slave devices; and entering the idle state for the slave devices.

8. The method as claimed in claim 7, wherein the period associated with the power-on time is equal to the product of the power-on time and the amplification parameter.

9. The method as claimed in claim 1, wherein the step in which said slave device sending the power-on time to the host device when said slave device leaves the idle state comprises:

sending a discovery command to the slave devices by the host device; and sending the power-on time to the host device through an acknowledgement command according to the discovery command by said slave device.

10. The method as claimed in claim 9, further comprising:

setting check time by the host device; wherein the starting time point of the check time is the time point at which the host device sends the discovery command to the slave devices; and resending the discovery command to the slave devices by the host device when the host device has not received the acknowledgement command from said slave device within the check time.

11. The method as claimed in claim 1, wherein the step in which the slave devices calculating their own respective power-on time of the slave devices by the slave devices comprises:

sending a reset command to the slave devices by the host device; and setting their addresses to 0 according to the reset command by the slave devices, and setting the time points when they are turned on to the time points when they receive the reset command as the power-on time by the slave devices.

12. The method as claimed in claim 1, wherein the step in which the host device setting an address for said slave device according to the power-on time when said slave device leaves the idle state comprises:

sending an address setting command to the slave devices by the host device; wherein the address setting command comprises the power-on time of said slave device;

comparing the power-on time in the address setting command with its own power-on time by said slave device; and sending an acknowledgement command to the host device to inform the host device that its address setting has been completed by said slave device when the power-on time in the address-setting command is the same as its own power-on time.

13. The method as claimed in claim 12, further comprising: setting check time by the host device, wherein the starting time point of the check time is the time point at which the host device sends the address setting command to the slave devices; and resending the address setting command to the slave devices by the host device when the host device has not received the acknowledgement command from said slave device within the check time.

14. The method as claimed in claim 1, further comprising:

receiving commands from the host device by the slave devices, but not sending any commands to the host device by the slave devices when the slave devices enter the idle state.

15. An RS485 system, comprising:
- a plurality of slave devices, configured to be turned on in sequence, calculate their own respective power-on times, and enter an idle state during the period associated with the power-on time; and
- a host device, configured to confirm that there are no addresses of the slave devices in a database;
- wherein when only one of the slave devices leaves the idle state, said slave device sends the power-on time to the host device; and
- wherein when said slave device leaves the idle state, the host device sets the address of said slave device according to the power-on time.

16. The RS485 system as claimed in claim 15, wherein the process for the slave devices to calculate respective power-on time comprises:
- the host device sends a reset command to the slave devices; and
- the slave devices set their addresses to 0 according to the reset command, and set the time points when they are turned on to the time points when they receive the reset command as the power-on time.

17. The RS485 system as claimed in claim 16, wherein the process for the slave devices to enter the idle state during the period associated with the power-on time comprises:
- the host device sends a delay command to the slave devices, wherein the delay command comprises an amplification parameter;
- the slave devices calculate the period associated with the power-on time according to the amplification parameter in the delay command and the power-on time; and
- the slave devices enter the idle state.

18. The RS485 system as claimed in claim 15, wherein the process to turn on the slave devices sequence comprises:
- the host device controls the sequential turning-on of the slave devices at regular intervals through at least one universal serial bus (USB).

19. The RS485 system as claimed in claim 15, wherein the process for the said slave device to send the power-on time to the host device when said slave device leaves the idle state comprises:
- the host device sends a discovery command to the slave devices; and
- the said slave device sends the power-on time to the host device through an acknowledgement command according to the discovery command.

20. The RS485 system as claimed in claim 15, wherein the process for the host device to set the address of said slave device according to the power-on time when said slave device leaves the idle state comprises:
- the host device sends an address setting command to the slave devices; wherein the address setting command comprises the power-on time of said slave device;
- said slave device compares the power-on time in the address setting command with its own power-on time; and
- said slave device sends an acknowledgement command to the host device to inform the host device that its address setting has been completed when the power-on time in the address-setting command is the same as its own power-on time.

* * * * *